United States Patent [19]
Ritts

[11] Patent Number: 5,506,459
[45] Date of Patent: Apr. 9, 1996

[54] MAGNETICALLY BALANCED SPINNING APPARATUS

[76] Inventor: Gary Ritts, 19252 Harliss St., Northridge, Calif. 91324

[21] Appl. No.: 528,722

[22] Filed: Sep. 15, 1995

[51] Int. Cl.⁶ ........................................... H02K 7/09
[52] U.S. Cl. ..................... 310/90.5; 335/306; 446/133; 446/256; 446/261
[58] Field of Search ..................... 335/296, 298, 335/302, 306; 310/90.5; 446/133

[56] References Cited

U.S. PATENT DOCUMENTS

| | | | |
|---|---|---|---|
| 2,747,944 | 5/1956 | Baermann | 310/90.5 |
| 3,614,181 | 10/1971 | Meeks | 310/90.5 |
| 3,747,998 | 7/1973 | Klein et al. | 310/90.5 |
| 4,382,245 | 5/1983 | Harrigan | 335/306 |
| 5,182,533 | 1/1993 | Ritts | 335/306 |
| 5,341,059 | 8/1994 | Fukuyama et al. | 310/90.5 |

Primary Examiner—Leo P. Picard
Assistant Examiner—Raymond M. Barrera
Attorney, Agent, or Firm—Paul Y. Feng; Poms, Smith, Lande & Rose

[57] ABSTRACT

A magnetically balanced spinning apparatus having an upright rotating shaft assembly that is balanced by circumscribing magnets is disclosed. The rotating shaft assembly is constructed from a single shaft with at least two magnets mounted thereon in a spaced apart relationship. The rotating shaft assembly is balanced on a pivot point at the bottom and spins on a weight bearing surface. A frame having side support magnets generally circumscribes the rotating shaft assembly wherein the support magnets and the rotating magnets of the rotating shaft assembly react to repel each other thereby balancing the rotating shaft assembly in a vertical orientation, and simultaneously levitating the rotating shaft assembly to minimize the effects of gravity thereon.

21 Claims, 3 Drawing Sheets

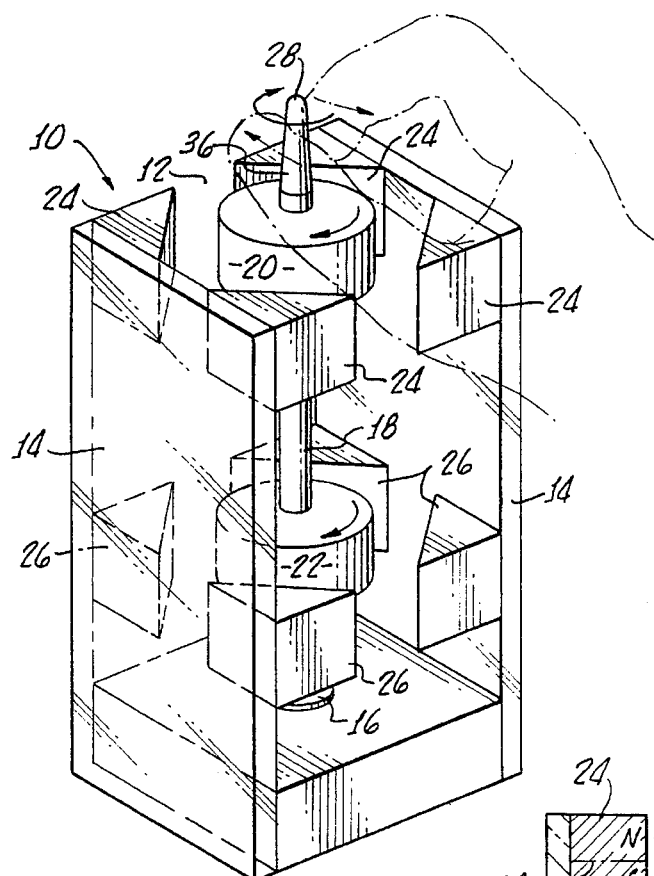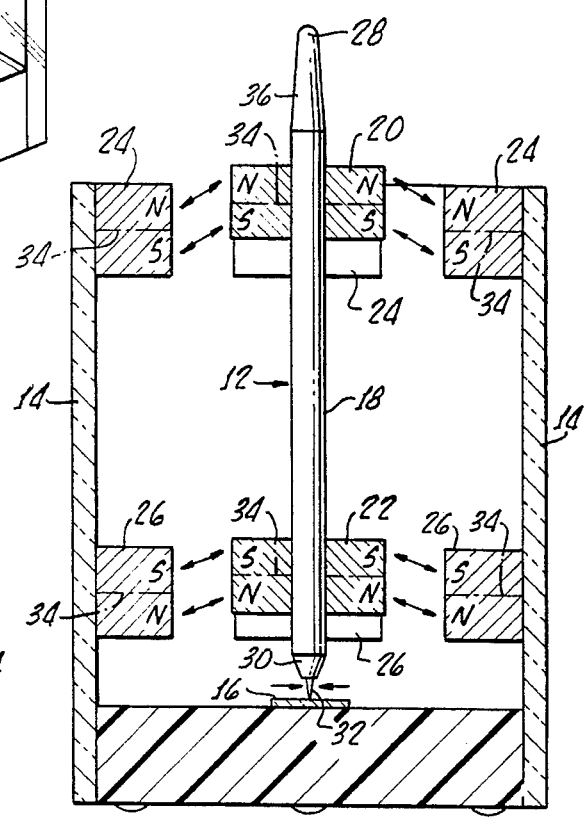

MAGNETICALLY BALANCED SPINNING APPARATUS

BACKGROUND OF THE INVENTION

1. Field of the Invention

The present invention relates to rotating devices with magnets. More precisely, the present invention relates to a magnetically rotating upright shaft assembly that is capable of spinning for an inordinate duration of time.

2. Prior Art and Related Information

Spinning tops and gyroscopes are popular as toys and as scientific tools. There have been constant efforts to improve the duration of the spin of a top or gyroscope in order to enhance its performance for functional purposes or simply for amusement. One approach has been to apply permanent magnets in the construction of the spinning device to improve its spin duration.

In one example, the top has a conventional construction with a vertical, pointed end shaft passing through a disk. The disk has mass which gives the top its rotational inertia. In addition, the disk is a permanent magnet. The top is designed to spin on a platform, also made from a permanent magnet. The magnetic field of the disk magnet reacts with the magnetic field of the platform to somewhat stabilize the spin of the top.

Unfortunately, this system is highly unstable because it relies on a single magnet bank comprised of the spinning disk magnet and corresponding platform magnet, and the top inherently has a tendency to wander about the platform. This wandering motion causes misalignment such that what was once a delicate balance between the magnetic fields becomes unbalanced. In this unbalanced condition, the random attraction and repelling of the magnetic poles exacerbates the unbalanced spinning of the top. Eventually the top is forced off the platform or drawn into the platform. In either case, the spinning ceases quickly and abruptly.

In order to improve spin duration and because of the unstable single magnet design, the platform requires a dimple or divot to receive the pointed shaft. This diminishes the amount of wandering that the spinning top undergoes and thus maintains alignment of the magnetic fields. In practice, however, despite the presence of the dimple, the top still tends to wander off the mark causing the entire system to become unbalanced again. The problem is that if the dimple is too deep, there is significant frictional drag between it and the pointed shaft; if the dimple is not deep enough or too big, the spinning top wanders out of alignment with the magnetic field of the platform. In either case, the spin duration is shortened. There is no improvement in spin duration over that of a conventional top not using any magnets.

A similar concept is taught in U.S. Pat. No. 4,382,245 to Harrigan, which discloses a levitation device comprised of a dish-shaped magnet having an upper surface of a first polarity and a lower surface of a second polarity disposed in a coaxial relationship to a second magnet having the opposite polarity. The magnetic fields of the device position the second magnet in spaced apart relationship from the dish-shaped magnet. Accordingly, the upper magnet can be rotated to provide gyroscopic stability.

U.S. Pat. No. 5,182,533 to Ritts discloses a magnetically levitated spinning axle display apparatus. The magnetically levitated spinning axle display apparatus has a base assembly and a horizontal axle assembly. The base assembly includes a base platform having a plurality of base magnets that are disposed spaced apart along an upper surface thereof. The platform has a vertical wall forming an axle support member, which is disposed at one end. The horizontal axle assembly includes a plurality of disk-shaped magnets spaced apart therealong, and an end of the axle assembly contacts the vertical wall. The polarity configurations of the axle magnets and the base magnets are set to repel one another to create free floating levitation of the axle assembly above the base and to generate a longitudinal lateral force sufficient to keep the axle end in contact with the vertical wall.

There are other applications of a rotating shaft with permanent magnets that interact with associated magnets to suspend the rotating shaft. For example, U.S. Pat. Nos. 2,747,944 and 3,326,610 to M. Baermann disclose a bearing for instruments and machines with vertical shafts or gyrocompasses wherein the bearing for the rotary parts of instruments and machines use magnetic forces to stabilize and balance the rotating parts. Similarly, Canadian Patent No. 575,928 to M. Baermann discloses a magnetic suspension bearing for instruments and machines. Other examples of magnetic suspension systems include U.S. Pat. No. 3,493,274 to A. G. Eroslie et al.; U.S. Pat. No. 3,243,238 to J. Lyman; U.S. Pat. Nos. 2,340,122 and 2,351,424 to A. Hansen, Jr. and U.S. Pat. No. 3,614,181 to C. Meeks.

None of the foregoing, however, shows a device used to balance a rotating, upright shaft assembly through magnetic fields in order to maintain and improve spin duration of the shaft assembly upon a pivot point, wherein the shaft assembly has rotating magnets thereon and is completely unfettered by contact with any fixed structure aside from the pivot point contacting a non-dimpled surface. Indeed, the prior art devices employ a system of bearings and bushings situated on the end or ends of a rotating shaft for the purpose of maintaining alignment and location of the rotating shaft within a magnetic field. The present invention, on the other hand, employs a surrounding magnetic field to maintain the alignment and location of a rotating shaft assembly without the need for bearings, bushings, or a dimpled contact surface, all of which greatly increase friction. Hence, there is a need for a magnetically balanced spinning shaft assembly that relies on magnetic fields to significantly improve spin duration for up to 50 minutes or more.

SUMMARY OF THE INVENTION

In view of the foregoing, it is therefore an object of the present invention to provide a magnetically balanced spinning apparatus having a rotating upright shaft assembly that is free to rotate and move in all directions, and is supported only by a pivot point. It is another object of the present invention to utilize magnets to help in balancing the rotating shaft and in levitating the shaft to minimize friction at the pivot point. It is still yet another object of the present invention to arrange the magnets such that the rotating shaft has a tendency to self-align without need of a groove or dimple at the point of contact with the pivot point. It is still yet another object of the present invention to provide a magnetically balanced apparatus whose spin can be initiated by manual rotation or by simple machines for high angular velocities.

In order to achieve the foregoing objects, the present invention in a preferred embodiment is directed to a magnetically balanced spinning apparatus comprising an upright shaft having a free top end and a bottom end terminating in a pivot point, a top magnet and a bottom magnet affixed to the upright shaft, and frame having a weight bearing surface supporting the upright shaft at the bottom pivot point, the frame further including top and bottom support magnets, wherein the top support magnet generally surrounds and is spaced apart from the top magnet, and the bottom support magnet generally surrounds and is spaced apart from the bottom magnet, whereby the shaft is rotated and spins on the pivot point and the top and bottom support magnets through respective magnetic fields help maintain the upright shaft spinning in an upright position. The top magnet and bottom magnet are preferably magnetic dipoles with a magnetic field that interacts with the respective magnetic fields generated by the top and bottom support magnets. The dipoles of the top and bottom magnets are arranged so that they oppose the dipoles of the supporting magnets so that like poles repel.

As a result, the upright shaft is maintained in a generally vertical condition as it spins. Moreover, the magnetic fields also lift upward on the upright shaft to somewhat negate the force of gravity on the mass of the spinning shaft and associated magnets. Accordingly, the amount of friction encountered by the pivot point and its contact with the weight bearing surface is reduced, enhancing the ability of the present invention to continue rotating for an inordinate amount of time.

In an alternative embodiment, the present invention includes a through hole in the shaft which is used to wind a coil of string to provide a pull-start for the upright shaft. Optional restraint brackets slide on rails disposed on the frame to temporarily engage the shaft as the rip cord is pulled. Once the rip cord is pulled and the shaft achieves maximum rotational velocity, the restraint brackets can be withdrawn and slid out of the rails allowing the shaft to spin freely.

In order to achieve the preferred alignment of magnetic fields, the present invention provides that the top and bottom dipole magnets are situated on the upright shaft so that they are at a slightly higher elevation than the surrounding top and bottom support magnets. The purpose is to locate the imaginary magnetic polarity dividing line of the top and bottom magnets at a higher elevation than the corresponding magnetic polarity dividing lines of the support magnets. In concept, the magnetic polarity dividing line or plane is an imaginary boundary separating the opposite poles of a magnet.

In the present invention, the polarities of the top magnet and adjacent support magnets are alike, as is the case with the bottom magnet and adjacent bottom support magnets. In this manner, the natural tendency for the like poles to repel each other slightly lifts the central rotating shaft upward and reduces the weight bearing down on the pivot point.

In addition, in the exemplary embodiment, the poles of the top magnet have an orientation that is the reverse of the orientation of the bottom magnet. Likewise, the poles are reversed between the top support magnets and the bottom support magnets.

In the present preferred embodiment, there are at least two spaced-apart banks of magnets in order to provide rotational and longitudinal stability in the rotating shaft. This stability is manifest once the shaft is rotated by observing the self-centering action of the rotating shaft. Furthermore, there is no need for a divot or dimple in the weight bearing surface; instead, the surface is smooth to minimize frictional drag on the pivot point.

As a result, the present invention has many advantages and features not found in conventional devices. For example, first, the present invention has a self-centering rotating upright shaft. Second, the present invention does not require a dimple or divot for receiving the pivot point of the shaft. Third, the present invention can be modified to have more than two banks of magnets for added stability. Fourth, all parts of the rotating shaft assembly are unfettered and do not engage any rigid structure, such as bushings or bearings, except at the pivot point so that there is virtually no contact friction. As a result, the spin duration of the present invention extends for up to 50 minutes or more.

DESCRIPTION OF THE DRAWINGS

The objects, features, and advantages of the present invention will be apparent to one skilled in the art from reading the following description in which:

FIG. 1 is a perspective view of a preferred embodiment of the present invention magnetically balanced spinning apparatus showing finger initiation of the rotational motion.

FIG. 2 is a top view of the embodiment shown in FIG. 1, noting the like magnetic polarities.

FIG. 3 is a sectional view of the present invention taken along line 3—3 of FIG. 2, showing the configuration of the poles of each magnet.

DETAILED DESCRIPTION OF THE INVENTION

Figure 4:
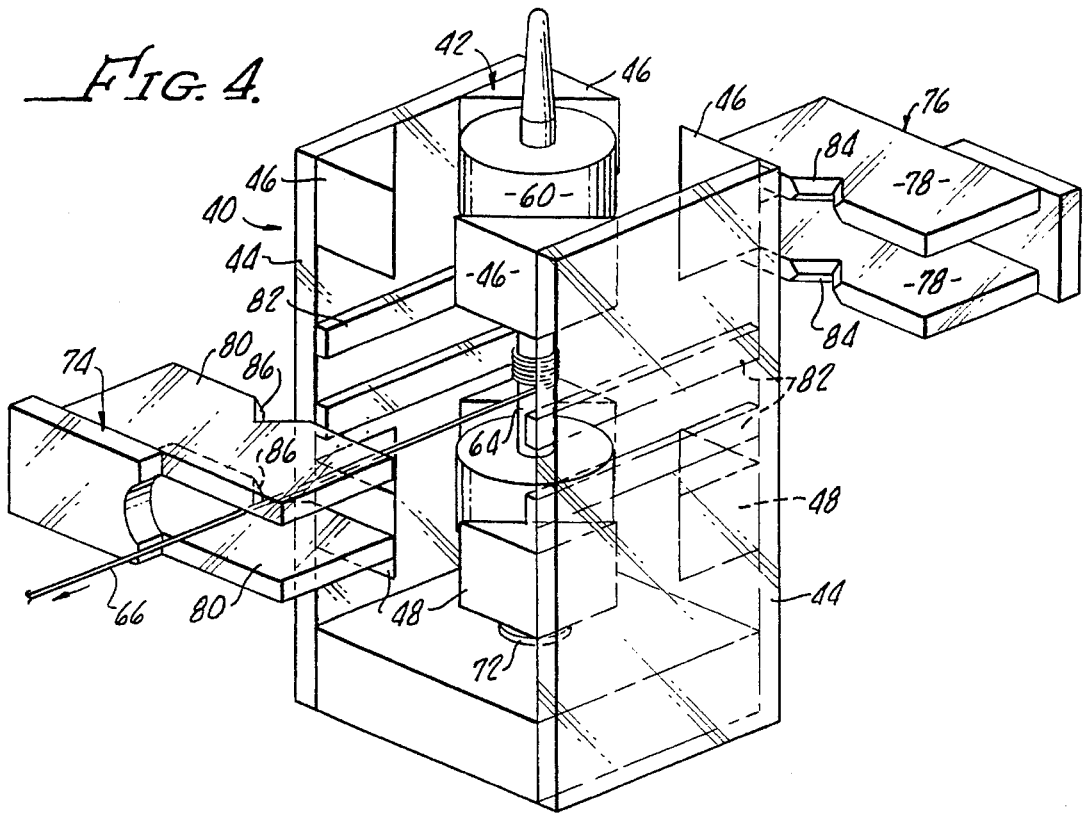
FIG. 4 is a perspective view of an alternative embodiment magnetically balanced spinning apparatus having a pull-start with removable restraint brackets that slide along horizontal rails.

The following specification describes a magnetically balanced spinning apparatus. In the description, specific materials and configurations are set forth in order to provide a more complete understanding of the present invention. But it is understood by those skilled in the art that the present invention can be practiced without those specific details. In some instances, well-known elements are not described precisely so as not to obscure the invention.

The present invention is directed a magnetically balanced spinning apparatus that uses magnetic fields to improve the spin of an upright, spinning central shaft assembly by stabilizing the spin and by reducing the amount of friction encountered at the pivot point. FIG. 1 provides a perspective view of a preferred embodiment magnetically balanced spinning apparatus 10 having a free spinning rotating shaft assembly 12, a frame 14 that generally circumscribes the rotating shaft assembly 12, and a weight bearing surface 16 on which the rotating shaft assembly 12 spins. The rotating shaft assembly 12 is preferably comprised of a cylindrical shaft 18 with a top magnet 20 spaced apart from a bottom magnet 22.

As seen in FIG. 1, support magnets 24, 26 provide the balancing magnetic fields that help maintain the rotating shaft assembly 12 in an upright position. Of course, it is not necessary for the support magnets 24, 26 to completely circumscribe the rotating shaft assembly 12. Indeed, the support magnets can be positioned not to circumscribe the rotating shaft assembly insofar as their placement ensures that the magnetic fields help balance the angular momentum and bending moments of the rotating shaft assembly in order to maintain it in an unright position. An example of this is the alternative embodiment shown in FIG. 7.

The top magnet 20 and bottom magnet 22 have a generally cylindrical shape to enhance rotation of the rotating shaft assembly 12. Of course, the top and bottom magnets 20, 22 may have other shapes known in the art. They are affixed to the shaft 18 by any means known in the art; adjustable grommets may be used so that their elevation may be changed if needed.

In general, the top and bottom magnets 20, 22 rotate along with the shaft 18. The top end 28 of the shaft 18 is free and unfettered as seen in FIG. 1. The bottom end 30 terminates with a sharp pivot point 32 as best seen in FIG. 3. FIG. 3 is a side elevation sectional view of the embodiment shown in FIG. 2 taken along line 3—3. FIG. 2 is a plan view of the embodiment shown in FIG. 1. Also, FIGS. 2 and 3 have phantom lines and arrows that indicate free lateral movement of the shaft 18.

FIGS. 2 and 3 are exemplary embodiments showing the preferred layout of the poles of the permanent dipole magnets used in the present invention. The present invention dipole magnets 20, 22, 24 and 26 are shaped from ferromagnetic materials known in the art. Of course, other types of magnets such as radially polarized magnets situated to produce similar repelling forces can be used and are contemplated in the present invention. To be sure, in an alternative embodiment, the top and bottom magnets are polarized radially, wherein a first pole is situated at and around the center while a second, opposite pole is disposed around the outer circumference. The surrounding support magnets are similarly polarized so that the portion of each support magnet closest to the top or bottom magnet has a polarity that repels the second pole at the outer circumference of the top and bottom magnets. With this construct, the present invention has a rotating shaft assembly that is magnetically balanced by the adjacent support magnets.

As seen in FIG. 3, each magnet has an imaginary magnetic polarity dividing line or plane 34 that, for the sake of explanation, defines the theoretical boundary between the north pole and the south pole. Of course, it is known in the art that no such discrete boundary exists in a dipole magnet. For the present purpose of illustration, however, the present invention provides that the magnetic polarity dividing line 34 of the top and bottom magnets 20, 22 are located at an elevation slightly higher than the magnetic polarity dividing line 34 of the adjacent top and bottom support magnets 24, 26.

Furthermore, as seen in FIG. 3, the poles of the top magnet 20 and associated top support magnet 24 are matched giving rise to a repelling force. Likewise, the poles of the bottom magnet 22 and the adjacent bottom support magnets 26 are alike. Consequently, there is a cumulative lifting force on the rotating assembly 12 from the magnetic fields. The lifting force from the magnetic fields opposes the weight of the rotating shaft assembly 12. This effectively minimizes the amount of friction encountered at the contact point where the pivot point 32 engages the weight bearing surface 16.

In order to further minimize friction, the weight bearing surface 16 is smooth, without dimples, divots, or the like. Moreover, the weight bearing surface is made from a hard material such as tungsten carbide, polished quartz, or glass to prevent abrasion from the sharp pivot point 32. Other materials known in the art may of course be used.

In the configuration shown in FIG. 3, the present invention rotating shaft assembly 12 has a self-centering effect wherein the rotating shaft assembly 12 tends to spin its way into an equilibrium so that the magnetic fields are balanced and the rotating shaft assembly 12 continues to spin without wobble or eccentric motion. Due to the low friction and absence of wasted energy from the rotating shaft assembly 12 wobbling, the present invention is able to spin on its pivot point 32 for an inordinate amount of time.

As seen in FIG. 1, the preferred embodiment shown is spun by finger manipulation as depicted by the phantom-line hand. To operate the present invention, a user pinches a tapered area 36 to spin the rotating shaft assembly 12. As mentioned earlier, due to the surrounding magnetic fields reacting with the top and bottom magnets 20, 22, the rotating shaft assembly 12 has a self-centering effect insofar as when it reaches its steady state, the rotating shaft assembly 12 is spaced apart from the surrounding support magnets and maintains its upright orientation for a significant amount of time before rotation decays and the rotating shaft assembly 12 no longer balances on the pivot point 32. This is an improvement over conventional devices where a steady-state spin is difficult to achieve due to imbalances in the system.

In the preferred embodiment, the presence of top and bottom magnets 20, 22 positioned on the shaft 18 improves the rotational inertia of the rotating assembly 12 thereby improving rotational stability, similar to a gyroscope. Moreover, the presence of the top and bottom magnets 20, 22 in a spaced apart manner and their interaction with the surrounding top and bottom support magnets 24, 26 are useful in maintaining the rotating shaft assembly 12 in an upright orientation, specifically offsetting any bending moments encountered by the shaft 18 that in conventional devices might topple the rotating shaft assembly 12.

FIG. 4 provides a perspective view of an alternative embodiment of the present invention magnetically balanced spinning apparatus 40. The construction of the magnetically balanced spinning apparatus 40 in this exemplary embodiment is similar to the embodiment shown in FIG. 1, comprising of a rotating shaft assembly 42, a frame 44, wherein the frame 44 has top and bottom support magnets 46, 48. The top and bottom support magnets 46, 48 produce a magnetic field that interacts with the magnetic field produced by top and bottom magnets 60, 62 mounted on shaft 64.

Figure 5:
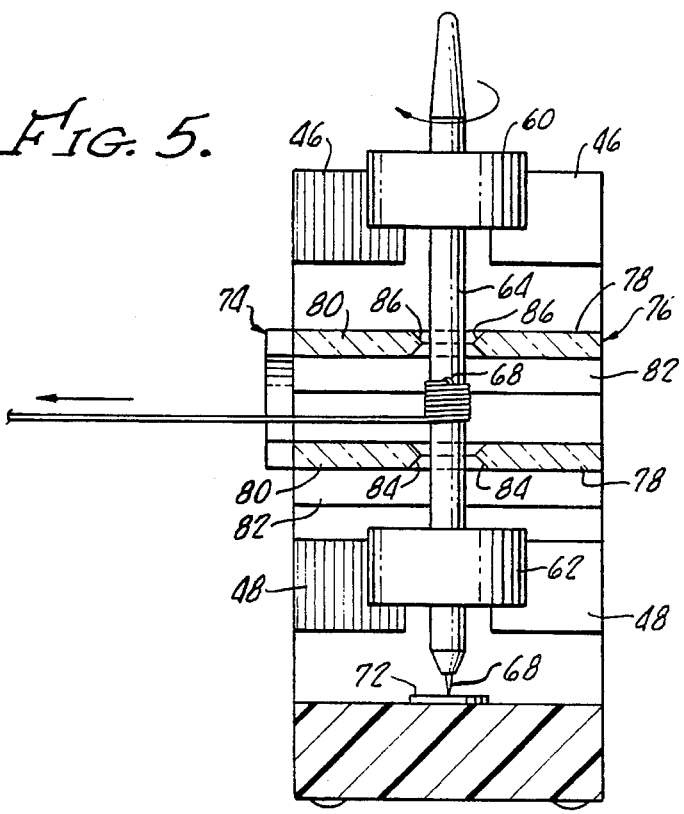
FIG. 5 is a side elevational view showing the side rails engaging and confining the upright shaft assembly as it is spun using the pull-start rip cord.

FIG. 5 is a side elevational view of the magnetically balanced spinning apparatus 40 shown in FIG. 4. In this exemplary embodiment, the rotating shaft assembly 42 includes a rip cord pull-start comprising of a string 66 that is wrapped around shaft 64. An optional through-hole 68 is provided in the shaft 64 to improve the grip of the string 66 as it is wrapped around the shaft 64. As a user tugs sharply on the string 66, the string 66 unravels and simultaneously places a torque on the shaft 64 thereby setting the rotating shaft assembly 42 into a high speed spin. The entire rotating shaft assembly 42 is supported by a preferably sharp pivot point 70 that balances on a weight bearing surface 72. As in the above embodiment, the weight bearing surface 72 is smooth and hard to place the least amount of frictional drag on the pivot point 70 by minimizing the area of contact.

In order to improve the efficacy of the rip cord pull-start, the present invention includes optional restraint brackets 74, 76 that help hold the rotating shaft assembly 42 in place while the rip cord is pulled sharply. The restraint brackets 74, 76 have parallel plates 78, 80 that slide along rails 82 formed on the interior of the frame 44. As seen in FIG. 5, the rails 82 guide and locate the restraint brackets 74, 76 so that their respective notched edges 84, 86 are positioned immediately adjacent to the shaft 64. There is, nevertheless, a small space between the shaft 64 and the adjacent notched edges 84, 86 to permit the shaft 64 to freely rotate and to move laterally a small amount. Each notched edge 84, 86 has a sharp leading edge that minimizes the surface area that may engage the shaft 64 as it is accelerated by the rip cord pull-start mechanism. Again, this ensures that there is very little drag on the accelerating shaft 64, while the restraint brackets 74, 76 can still counteract the lateral forces acting on the shaft 64 when the rip cord is pulled.

Once the rotating assembly 42 is set in motion with the rip cord pull-start mechanism, the lateral force from the string 66 no longer exists and there is no need to retain the rotating shaft assembly 42 within the confines of the restraint brackets 74, 76. Accordingly, the restraint brackets 74, 76 may optionally be removed by sliding them out of contact with the rails 82.

In this exemplary embodiment, the rip cord pull start mechanism is able to generate very high angular velocities in the rotating shaft assembly 42. That in addition to the low friction contact point and the diminished gravitational effect on the rotating assembly 42 all contribute to an inordinate duration of spin time of the rotating shaft assembly 42 before it loses speed and stops after its spin decays. Empirical studies have shown that in prototypes of the present invention, the rotating shaft assembly can spin for over fifty minutes.

As in the embodiment shown in FIG. 1, the positioning of the magnets in this embodiment is arranged to counter the effects of gravity on the rotating shaft assembly 42 and to maximize the steadying effects of the magnetic fields on the rotating assembly 42. As such, it is preferable that the top and bottom support magnets 46, 48 generally circumscribe the top and bottom magnets 60, 62. It is also preferable that the imaginary polarity dividing line of the top and bottom magnets 60, 62 be positioned slightly above the magnetic polarity dividing line of the respective top and bottom support magnets 46, 48.

In the present invention, the frame can be made from a material known in the art and is preferably made from a clear acrylic material. The shaft is made from a brass or other lightweight, non-ferromagnetic material. In order to minimize wear and frictional effects, the weight bearing surface is made from any very hard material known in the art. In the exemplary embodiment, the weight bearing surface is made from quartz crystal or glass. In order to maximize strength, the pivot point is preferably made from a high carbon steel or like material.

Needless to say, the polarities of the permanent dipole magnets shown in FIGS. 2 and 3 can be rearranged to obtain different results. Furthermore, the shapes and numbers of the top and bottom magnets and the surrounding top and bottom support magnets can be varied as needed. Indeed, FIGS. 6–9 are perspective views of alternative embodiments of the present invention.

Figure 6:
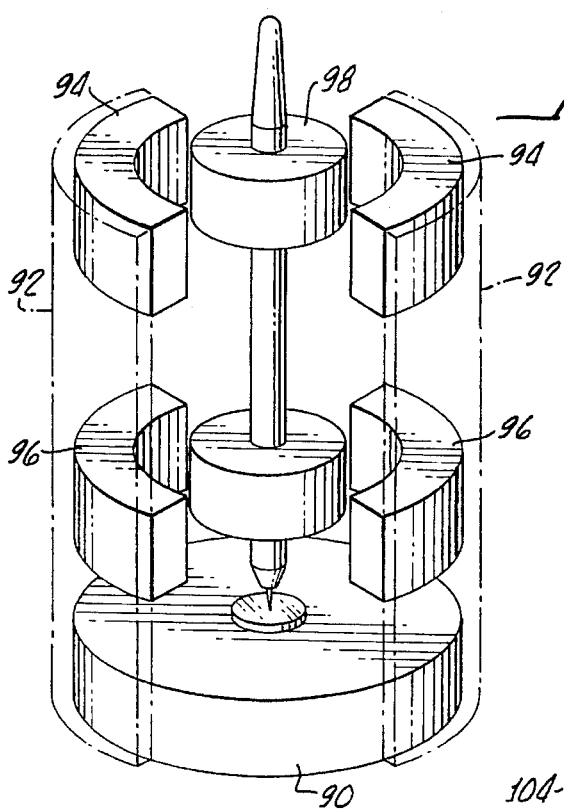
FIG. 6 is a perspective view of an alternative embodiment of the present invention having curved support magnets.

FIG. 6 is a perspective view of an alternative embodiment of the present invention magnetically balanced spinning apparatus having a circular base 90 with a curved frame 92 having crescent shaped top and bottom support magnets 94, 96. The rotating shaft assembly 98 has the same configuration as in the previous embodiments.

Figure 7:
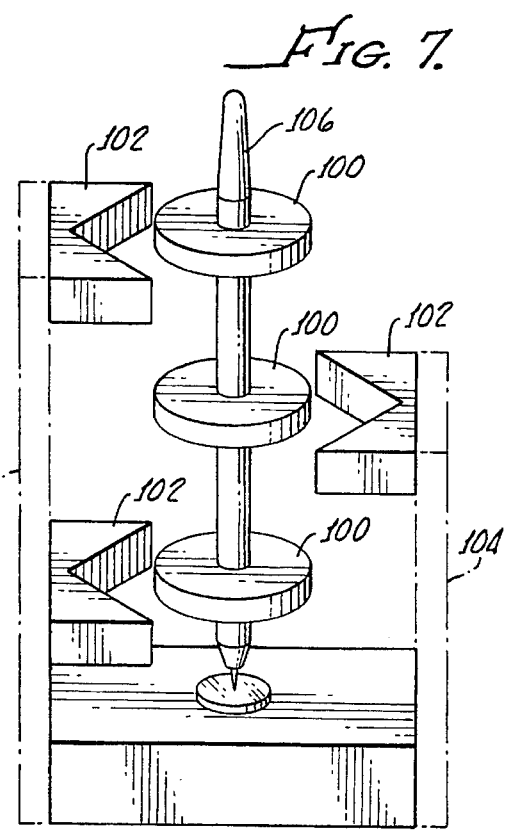
FIG. 7 is a perspective view of another alternative embodiment showing a different arrangement having three banks of magnets.

In FIG. 7, the alternative embodiment includes three banks of magnets wherein each bank is comprised of a rotating magnet 100 and an associated support magnet 102 mounted to frame 104. The bending moments created by the magnetic fields are balanced by placing the support magnets on opposite sides of the rotating assembly 106. Naturally, the individual magnetic field strengths of each magnet can be adjusted by selecting the size or type or magnet in order to balance the bending moments encountered by the rotating shaft assembly 106 if needed.

Figure 9:
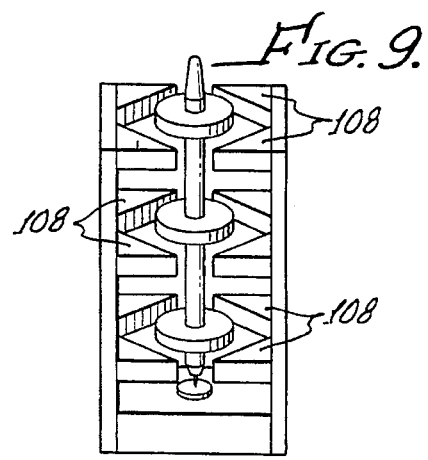
FIG. 9 is yet another alternative embodiment showing three banks of magnets.

FIG. 9 is yet another alternative embodiment similar to that shown in FIG. 7 wherein an opposed complementary bank of support magnets 108 have been added. It is clear based on the embodiments shown in FIGS. 7 and 9 that there can be more than two or three banks of interacting rotating and support magnets.

Figure 8:
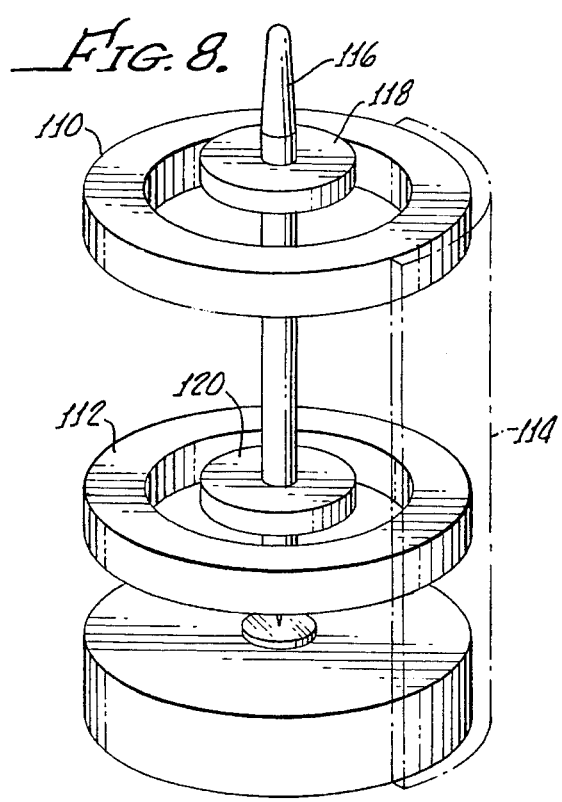
FIG. 8 is another alternative embodiment of the present invention having a singular top support magnet and a singular bottom support magnet.

FIG. 8 shows yet another alternative embodiment wherein each of the top and bottom support magnets is constructed from a single piece of magnetic material. A curved support frame 114 is positioned on one side to be unobtrusive. The rotating shaft assembly 116 has preferably a construction similar to the embodiments shown above. In this particular embodiment, it is again preferable that the top and bottom magnets 118, 120 are located at an elevation slightly above the respective support magnets 110, 112 such that the magnetic polarity dividing line of the former is slightly above the magnetic polarity dividing line of the latter. It should be clear based on the foregoing that the present invention can be constructed using different sized and shaped support magnets and rotating magnets, insofar as their magnetic fields are opposed in order to balance the rotating assembly so that there are no eccentric bending moments encountered by the spinning upright shaft.

It is understood that various changes and modifications of the preferred embodiments described above are apparent to those skilled in the art. Such changes and modifications can be made without departing from the spirit and scope of the present invention. It is therefore intended that such changes and modifications are also within the spirit and scope of the present invention as defined by the following claims.

What is claimed is:

1. A magnetically balanced upright spinning apparatus comprising:

a shaft having a free end at a top and a pivot point at a bottom;

a top magnet mounted on the shaft to rotate therewith;

a bottom magnet mounted on the shaft beneath the top magnet to rotate therewith;

a weight bearing surface supporting the pivot point;

a frame having a top support magnet and a bottom support magnet, wherein the top support magnet is disposed adjacent and spaced apart from the top magnet, and the bottom support magnet is disposed adjacent and spaced apart from the bottom magnet;

whereby the shaft is rotated and spins freely, and the support magnets through magnetic lines of force act on the top and bottom magnets to help balance the rotating shaft on the pivot point.

2. The magnetically balanced upright spinning apparatus of claim 1, wherein the top and the bottom magnets and the top and bottom support magnets each have respective magnetic polarity dividing lines, wherein the magnetic polarity dividing line of the top magnet is at an elevation higher than an elevation of the magnetic polarity dividing line of the top support magnet.

3. The magnetically balanced upright spinning apparatus of claim 1, wherein top magnet and the bottom magnet each further comprises a magnetic dipole with the two poles separated by a magnetic polarity dividing plane having a generally horizontal orientation.

4. The magnetically balanced upright spinning apparatus of claim 1, wherein the top and bottom magnets have a circular shape.

5. The magnetically balanced upright spinning apparatus of claim 1, wherein the top and bottom support magnets surround the respective top and bottom magnets.

6. The magnetically balanced upright spinning apparatus of claim 1, wherein the top and bottom magnets each has a respective top side and bottom side, and the top and bottom support magnets each has a respective top side and bottom side, and wherein the top side and the bottom side of the top magnet and the top side and the bottom side of the top support magnet have like magnetic polarities, and the top side and the bottom side of the bottom magnet and the top side and the bottom side of the bottom support magnet have like magnetic polarities.

7. The magnetically balanced upright spinning apparatus of claim 1, wherein the apparatus further comprises a pull-start rip cord wrapped around the shaft, and restraint brackets that removably engage the shaft and slide along horizontal rails disposed on the frame.

8. The magnetically balanced upright spinning apparatus of claim 7, wherein each restraint bracket includes a V-shape notch engaging the shaft.

9. The magnetically balanced upright spinning apparatus of claim 1, wherein the apparatus further comprises an intermediate level magnet disposed on the shaft between the top magnet and the bottom magnet, and an intermediate level support magnet disposed on the frame between the top support magnet and the bottom support magnet.

10. The magnetically balanced upright spinning apparatus of claim 1, wherein the weight bearing surface includes a tungsten carbide material.

11. A magnetically balanced spinning apparatus comprising:
an upright shaft having a free top end and a bottom end terminating in a pivot point;
a top magnet and a bottom magnet affixed to the upright shaft; and
a frame having a smooth weight bearing surface supporting the upright shaft at the bottom pivot point, the frame further including top and bottom support magnets, wherein the top support magnet generally surrounds and is spaced apart from the top magnet, and the bottom support magnet generally surrounds and is spaced apart from the bottom magnet;
whereby the shaft is rotated and spins on the pivot point and the top and bottom support magnets via magnetic lines of force help maintain the upright shaft spinning in an upright position.

12. The magnetically balanced spinning apparatus of claim 11, wherein the top and bottom magnets have a circular shape and the top and bottom support magnets have a triangular shape and are disposed around a circumference of the respective top and bottom magnets.

13. The magnetically balanced spinning apparatus of claim 11, wherein the top magnet further comprises a top surface, and the top support magnet further comprises a top surface, wherein the top surface of the top magnet is at a higher elevation than the top surface of the top support magnet.

14. The magnetically balanced spinning apparatus of claim 11, wherein a top surface of the top magnet and a top surface of the top support magnet have like magnetic poles.

15. The magnetically balanced spinning apparatus of claim 11, wherein the top support magnet is comprised of a plurality of individual, discrete magnets disposed about an outer perimeter of the top magnet.

16. The magnetically balanced spinning apparatus of claim 11, wherein the frame further comprises four corners and the top and bottom magnets are disposed in the four corners.

17. The magnetically balanced spinning apparatus of claim 11, wherein the top and bottom magnets and the top and bottom support magnets each further comprises respective magnetic polarity dividing lines, and wherein the magnetic polarity dividing line of the top magnet is positioned at a higher elevation than the magnetic polarity dividing line of the top support magnet.

18. The magnetically balanced spinning apparatus of claim 11, wherein the top and bottom magnets and the top and bottom support magnets each further comprises respective magnetic polarity dividing lines, and wherein the magnetic polarity dividing line of the bottom magnet is positioned at a higher elevation than the magnetic polarity dividing line of the bottom support magnet.

19. The magnetically balanced spinning apparatus of claim 11, wherein the free top end further comprises a tapered gripping surface.

20. A magnetically balanced spinning apparatus comprising:
a freely rotating upright shaft having a free top end and a pointed bottom pivot point;
a top dipole magnet having a cylindrical shape affixed to the shaft;
a bottom dipole magnet having a cylindrical shape disposed on the shaft beneath the top dipole magnet with a space therebetween;
a frame circumscribing the upright shaft and including a flat, weight-bearing surface on which the pivot point rotates;
a first bank of dipole magnets disposed on the frame circumscribing and spaced apart from the top magnet;
a second bank of dipole magnets disposed on the frame beneath the first bank, and further circumscribing and spaced apart from the bottom dipole magnet;
wherein the top and bottom dipole magnets and the first and second banks of dipole magnets each includes magnetic poles separated by a magnetic polarity dividing line, and wherein the magnetic polarity dividing line of the top dipole magnet is positioned at a higher elevation than the magnetic polarity dividing line of the first bank of dipole magnets, and the poles of the top dipole magnet and the first bank of dipole magnets have the same pole orientation; and wherein the magnetic polarity dividing line of the bottom dipole magnet is positioned at a higher elevation than the magnetic polarity dividing line of the second bank of dipole magnets, and the poles of the bottom dipole magnet and the second bank of dipole magnets have the same pole orientation;

whereby the first and second banks of dipole magnets through a magnetic field react with the top and bottom dipole magnets to help maintain the upright shaft rotating in a generally vertical orientation.

21. The magnetically balanced spinning apparatus of claim 20, wherein a pole orientation of the top dipole magnet is reversed from a pole orientation of the bottom dipole magnet.

* * * * *